Figure 1:
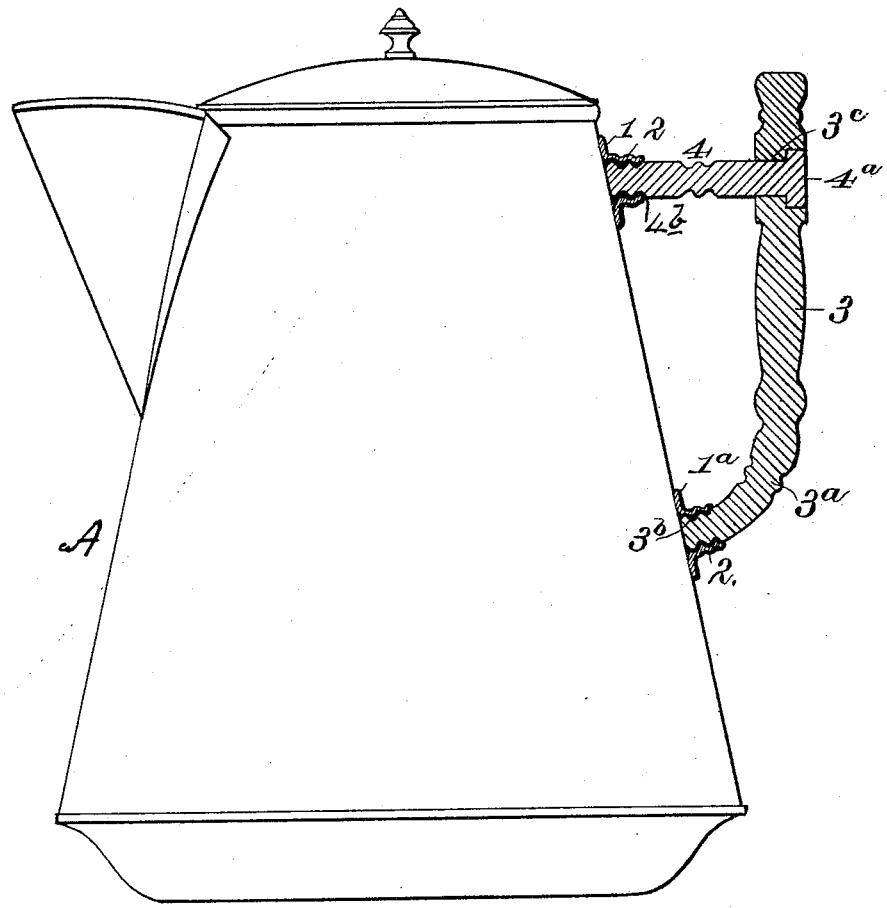

(No Model.) 2 Sheets—Sheet 1.

T. BAUER.
COLD HANDLE FOR COFFEE OR TEA POTS.

No. 460,626. Patented Oct. 6, 1891.

Witnesses:
F. P. Cornwall,
A. M. Parkins

Inventor:
Thomas Bauer
by F. W. Ritter Jr.
Atty

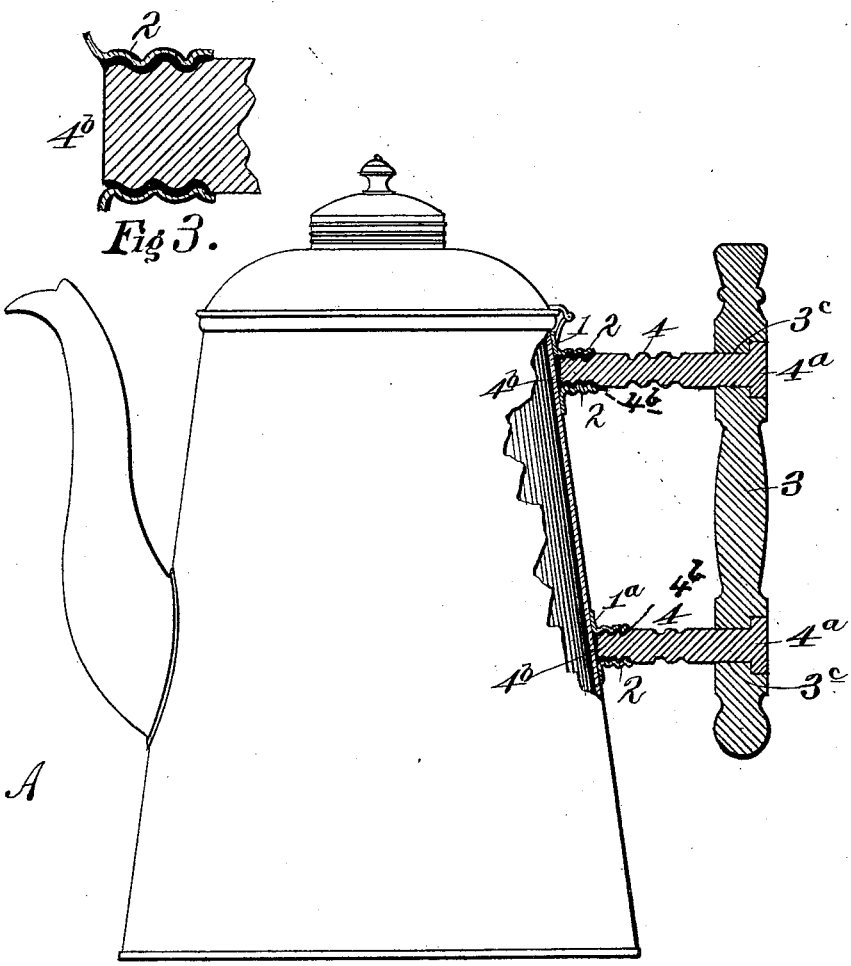

UNITED STATES PATENT OFFICE.

THOMAS BAUER, OF KOKOMO, INDIANA.

COLD HANDLE FOR COFFEE OR TEA POTS.

SPECIFICATION forming part of Letters Patent No. 460,626, dated October 6, 1891.

Application filed April 18, 1891. Serial No. 389,471. (No model.)

*To all whom it may concern:*

Be it known that I, THOMAS BAUER, a citizen of the United States, residing at Kokomo, in the county of Howard and State of Indiana, have invented certain new and useful Improvements in Cold Handles for Coffee-Pots, Tea-Pots, and Like Vessels; and I hereby declare the following to be a full, clear, and exact description of the same, reference being had to the accompanying drawings, in which—

Figure 1 is an elevation of a coffee-pot, showing in section a cold handle embodying my invention. Fig. 2 is an elevation, partly in section, of a tea-pot with handle, showing a modified manner of applying my invention; and Fig. 3 is an enlarged detail sectional view showing the manner of connecting the handle-post and its flange.

Like symbols refer to like parts wherever they occur.

Heretofore in the construction of non-conducting or wooden handles for coffee and tea pots and like articles it has been the common custom to connect the several parts of the handle with each other, or with the post-flanges attached to the vessel, by means of metal rods, rivets, or screws, which metal connections, being good heat-conductors in a measure, defeated the object intended to be accomplished by the use of wood enameled handles—viz., the production of a "cold handle," and, further, said metallic connections by charring the wood of the handle conduced to the more or less rapid destruction of the handle, so as in course of time to render its connections weak and unsafe.

The object of my present invention is to produce a non-conducting handle devoid of metallic or equivalent heat-conveying connections, and therefore practically a cold handle stronger, cheaper, and more durable than any heretofore produced.

To this end the main feature of my invention embraces the combination of an exteriorly-threaded wooden post and a wooden handle-bar, one of which passes through an orifice in the other, and a threaded post-flange adapted to receive the threaded end of the handle-post, whereby the several parts may be connected with each other and with the vessel without the introduction into the wood of metallic rods, rivets, screws, or equivalent heat-conveying fastenings. There are also other minor features of invention, all as will hereinafter more fully appear.

I will now proceed to describe my invention more fully, so that others skilled in the art to which it appertains may apply the same.

In the drawings, A indicates the vessel to which the non-conducting or cold handle is to be applied, and which may be of any desired pattern or class.

1 1$^a$ indicate post-flanges for the attachment of the cold handle to the vessel. These post-flanges may be annular disks of cup form or any desired shape, and can be attached to the vessel in any of several well-known ways. They are formed with internally-threaded collars 2 for the reception of the threaded ends of the handle-posts.

3 indicates the handle-bar, which may be curved as shown in Fig. 1, so that its lower end 3$^a$ constitutes one post of the handle, in which case its extremity will be threaded, as at 3$^b$, to engage with the thread of the lower post-flange 1$^a$, or it may be a practically straight bar, as shown in Fig. 2, in which latter case a second and separate handle-post will have to be provided. This handle-bar 3 is preferably perforated, as at 3$^c$, for the passage of the handle-post; but, if desired, the post may be perforated for the passage of the handle. The latter construction is not, however, recommended, as owing to the direction of the weights and strains a less strong and serviceable handle is produced.

4 indicates the handle-posts, one or more of which can be used, according to the construction adopted. The post 4 is of a diameter to fit firmly in the orifice 3$^c$ of the handle-bar 3, and is preferably provided at one end with a button or head 4$^a$, which may be let into the handle-bar so as to be flush therewith, as shown in the drawings, or, if allowed to project, may have an ornamental finish. The opposite end of handle-post 4 is threaded, as at 4$^b$, to fit into the internally-threaded collar 2 of the post-flange 1.

The several parts may be connected or combined by passing the handle-posts through the handle-bar and entering the threaded end of the post or posts into the internally-threaded collars of the post-flanges, and the entire handle may then be coated with any of the well-known compositions and baked to produce a strong, serviceable, and practically enameled cold handle devoid of rods, rivets, screws, or other metallic connections.

Having thus described my invention, what I claim, and desire to secure by Letters Patent, is—

1. The combination, in a wooden or cold handle for culinary vessels, of a handle-post exteriorly threaded at one end, a handle-bar, one of said parts passed through an orifice in the other, and a post-flange having an internally-threaded collar to receive the end of the handle-post, substantially as and for the purposes specified.

2. The combination, in a wooden or cold handle for culinary vessels, of a curved handle-bar threaded at one end, a post threaded at one end, one of said parts passed through an orifice in the other, and post-flanges having internally-threaded collars, substantially as and for the purposes specified.

In testimony whereof I affix my signature, in presence of two witnesses, this 15th day of April, 1891.

THOMAS BAUER.

Witnesses:
CHAS. A. DOLMAN,
E. S. HAHN.